H. C. MOEN.
TRANSPLANTING DEVICE.
APPLICATION FILED FEB. 12, 1916.
1,186,595.
Patented June 13, 1916.
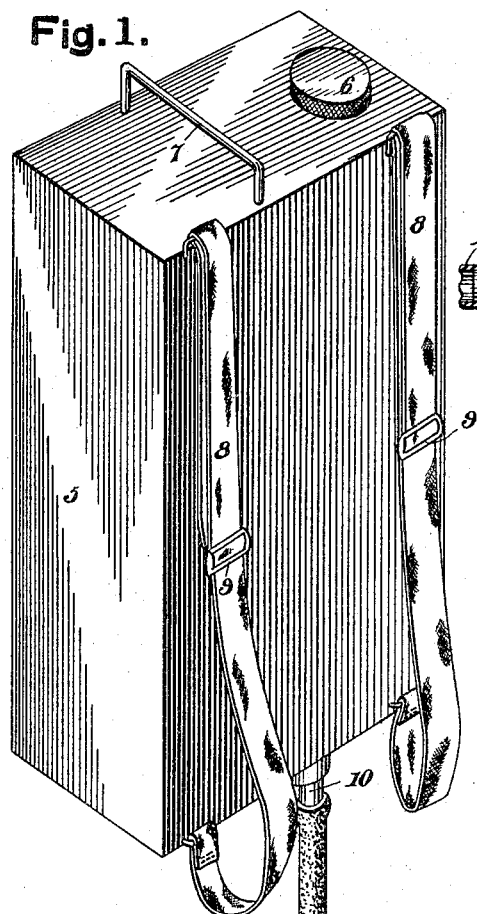
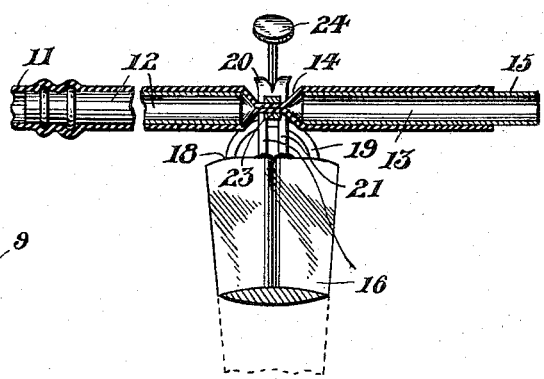
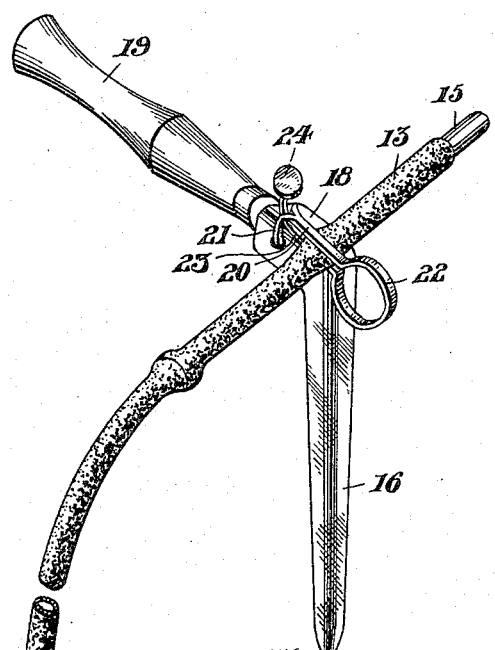
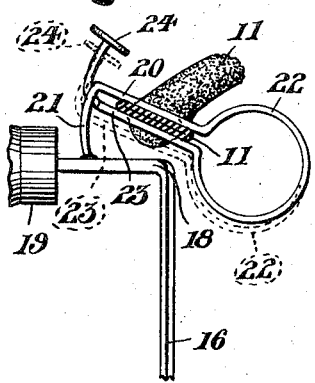
Inventor
H. C. Moen
By
N. M. Wilson
Attorney

UNITED STATES PATENT OFFICE.

HERMAN C. MOEN, OF MADISON, WISCONSIN.

TRANSPLANTING DEVICE.

1,186,595.  Specification of Letters Patent.  Patented June 13, 1916.

Application filed February 12, 1916.  Serial No. 77,897.

*To all whom it may concern:*

Be it known that I, HERMAN C. MOEN, a citizen of the United States, residing at Madison, in the county of Dane and State of Wisconsin, have invented certain new and useful Improvements in Transplanting Devices, of which the following is a specification.

This invention relates to certain new and useful improvements in transplanting devices.

The primary object of the present invention is to provide a transplanting device that may be used as a moistener and fertilizer for plants, and particularly for the resetting of tobacco plants.

A further object of the invention is to provide a transplanting device that is especially adapted for tobacco plants in which there is provided an implement adapted for insertion into the ground and having associated therewith a water tank and flexible tube, the tube being normally compressed by means carried by the implement when it is desired to retard the flow of water or other fluid.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—Figure 1 is a perspective view of a transplanting device built in accordance with the present invention, illustrating the flexible fluid delivery tube in combination with an earth-penetrating implement and the tube compressor carried by the implement. Fig. 2 is a detail sectional view of a portion of the device, illustrating a portion of the earth-penetrating implement and a portion of the fluid tube being in section, better to illustrate the pipe inserts for the portions of the tube adjacent the compressor, and, Fig. 3 is a detail sectional view of a portion of the device illustrating more fully in detail the compressor and a section of the tube clamped therebetween with the mounting implement for the compressor.

One of the principal objects of the present invention is in the combination with a solid earth-penetrating implement, a flexible water tube that is attached thereto by a particular form of compressor so that after an opening has been made in the earth, as by the solid implement disclosed, the implement may be removed and shifted laterally to move the discharge end of the tube above the opening in the ground, at which time the compressor may be released from the tube to permit the water or other fluid to flow therethrough and into the ground opening. Previous devices include hollow earth-boring implements with the fluid means passing through the implement while the same is within the opening.

Referring more in detail to the accompanying drawing, which shows one embodiment of the present invention, the reference numeral 5 designates a tank or water receptacle of any suitable design having a filling opening in the upper end thereof to be closed by a cap 6, while a handle 7 is provided which will enable the container or receptacle to be carried in a convenient manner.

In the use of the transplanter as shown, it is desirable to mount the same on the body or back of the user, and to this end, the shoulder straps 8 are provided, the same being permanently secured at their lower ends to the lower end of the receptacle 5 and having a loop connection at their upper ends with the upper end of the receptacle, while adjustable buckles 9 permit of a shortening or lengthening of the shoulder straps as is obvious.

The lower end of the receptacle 5 is provided with an outlet nipple 10 upon which one end of a flexible tubing 11 is received, while the other end of the tube is formed in a manner as more clearly illustrated in Fig. 2. The discharge end of the flexible tubing 11 has received therein a pair of spaced metallic tubular members 12 and 13, the intervening portion of tubing 14 facilitating the positioning of the compressor to be presently described. The outer terminal end 15 of the tubular member 13 projects beyond the terminal end of the tube 11 so that the fluid contents of the receptacle 5 will be more straightly guided in its passage from the tube by the rigid form of member 13.

The main features of the present invention refer to the combination with the earth-penetrating implement of the flexible tubing 11, and also the particular compressing means for the tube to retard the flow of fluid therethrough. The form of implement shown includes an earth-penetrating shank 16 of the form, more clearly shown in Figs. 1 and 2, there being provided a sharpened entering end 17 and an enlarged right-angularly projecting head 18, while a handle 19 of suitable shape and design is secured to the head 18. A compressor of the form best illustrated in Fig. 3 is permanently secured to the head 18 of the earth-penetrating implement, the compressor including an upper bar 20 bifurcated at its inner end with the furcations 21 slightly spread apart and angularly bent relative to the bar 20 and secured at their lower ends in any suitable manner to the head 18. The outer end of the bar 20 continues in a circular resilient loop 22 and from the loop continues rearwardly as at 23, the portion 23 being in the form of a bar and extending parallel to the bar 20 while the inner end of the portion 23 is upwardly bent to provide a hand-operating button 24. In view of the resilient circular portion 22, the bar 23 is normally held in its uppermost position adjacent the bar 20 so that when the bars 20 and 23 are not separated by the button 24, the compressor will be placed under tension, and an object positioned between the bars will therefore be compressed. The intervening portion 14 of the tube between the metallic tubular members 12 and 13 is received between the bars 20 and 23 as is clearly illustrated and the fluid within the receptacle 5 passing therefrom by way of the tube 11 will be checked or retarded by the compressor.

The earth-penetrating shank 16 may be forced into the earth by the handle 19 and when an opening of the desired shape and size has been made, the implement may be removed and shifted to bring the projecting end 15 of the tubular member 13 at a point adjacent the ground opening, at which time pressure on the button 24 will separate the bars 20 and 23 and permit the fluid in the receptacle 5 to pass through the tube and from the outlet end 15 into the ground opening. When the plant is positioned within the opening, the shank 16 of the implement may alone be used as for packing or tamping the soil about the base or roots of the plant if it be so desired.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. A transplanting device comprising in combination, an earth-penetrating implement, a tube compressor carried thereby, a tube associated with said compressor, and means for feeding fluid to the tube.

2. A transplanting device comprising in combination, a solid earth-penetrating implement, a tube compressor carried thereby, said compressor including a pair of spaced parallel bars, a resilient circular loop connecting the outer ends of the bars, the inner ends of the bars being bent in opposite directions adapted for attachment to the earth-penetrating implement and as a compressor controlling member, a flexible tubing positioned between the parallel bars of the compressor, and a water receptacle associated with said tubing.

3. A transplanting device comprising in combination, an earth-penetrating implement, a compressor permanently secured thereto, a flexible tubing associated with said compressor, metallic tubular members received within said flexible tubing and having the adjacent ends slightly spaced to enable the intervening portion of the tubing to be engaged by the compressor, and means for feeding fluid to the tubing.

4. A transplanting device including a water receptacle, a flexible tubing connected thereto at one of its ends, the other end of said tubing having a pair of metallic tubular members received therein with the adjacent ends slightly spaced apart, the outer terminal end of the outwardly positioned tubular member projecting outwardly of the free end of the tubing, an earth-penetrating implement, and a compressor carried thereby adapted for engagement with the intervening portion of the flexible tubing between the adjacent ends of the metal tubes.

5. A transplanting device including an earth-penetrating implement having a shank portion of solid construction, a right-angularly disposed head carried by the shank, a handle carried by the head, a resilient tube compressor carried by the upper face of the head, a flexible tubing associated with said compressor and having the terminal end thereof extending laterally of the shank, and means for supplying fluid to the flexible tubing.

In testimony whereof I affix my signature.

HERMAN C. MOEN.

Witnesses:
 GEO. O. MOEN,
 VAL STODDARD.